United States Patent
Hill

(10) Patent No.: US 7,556,134 B2
(45) Date of Patent: Jul. 7, 2009

(54) MAGNETIC FRICTION CLUTCH

(75) Inventor: Wolfgang Hill, Karlsruhe (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 11/998,885

(22) Filed: Dec. 3, 2007

(65) Prior Publication Data

US 2008/0149449 A1    Jun. 26, 2008

Related U.S. Application Data

(63) Continuation of application No. PCT/DE2006/000774, filed on May 4, 2006.

(30) Foreign Application Priority Data

Jun. 2, 2005    (DE)    ........................ 10 2005 025 268

(51) Int. Cl.
F16D 27/115    (2006.01)
(52) U.S. Cl. ............. 192/84.91; 192/84.96; 192/107 M
(58) Field of Classification Search ............... 192/84.91
See application file for complete search history.

(56) References Cited

U.S. PATENT DOCUMENTS

| | | | | |
|---|---|---|---|---|
| 3,384,213 | A | * 5/1968 | Bernard et al. | ........... 192/84.91 |
| 4,305,198 | A | 12/1981 | Kanamaru et al. | |
| 4,749,073 | A | 6/1988 | Olsen | |
| 5,372,228 | A | * 12/1994 | VanLaningham et al. | ..................... 192/84.941 |
| 2004/0256192 | A1 | 12/2004 | Hill et al. | |

FOREIGN PATENT DOCUMENTS

| | | |
|---|---|---|
| DE | 10 2004 015 655 A1 | 10/2004 |
| EP | 0 810 384 A1 | 12/1997 |
| GB | 857363 | 12/1960 |
| JP | 56055720 A | 5/1981 |

\* cited by examiner

Primary Examiner—Richard M. Lorence
(74) Attorney, Agent, or Firm—Davidson, Davidson & Kappel, LLC

(57) ABSTRACT

A magnetic friction clutch has two clutch parts, supported so that they can rotate relative to each other around an axis of rotation. A first clutch part has at least two clamping jaws which are movable somewhat toward and away from each other. A second clutch part, situated between the clamping jaws, is of disk-shaped design. The clamping jaws are pressable against the second clutch part by the magnetic force of a variable magnetic flux which is carried in the clutch parts in a soft magnetic material, in order to form a frictionally engaged connection between the clutch parts. The second clutch part has a plurality of soft magnetic ring zones permeated by the magnetic flux, which extend in the circumferential direction and are separated from each other in the radial direction by slots running in the circumferential direction. Ring zones adjacent to each other in the radial direction are connected with each other by bridging links. The slots are filled with a solidified casting material that connects the ring zones with each other. Inner and/or outer circumferential surfaces of the ring zones that face each other follow a line that deviates from a circular line running concentric to the axis of rotation. The second clutch part can have a plurality of layers made of different soft magnetic materials.

12 Claims, 9 Drawing Sheets

MAGNETIC FRICTION CLUTCH

This application is a continuation of prior International Application PCT/DE2006/000774, filed on May 4, 2006, which is hereby incorporated by reference herein.

BACKGROUND

The invention relates to a magnetic friction clutch, having at least two clutch parts supported so that they are rotatable relative to each other around an axis of rotation, where a first clutch part has at least two clamping jaws that are movable somewhat toward each other and away from each other, where a second clutch part situated between the clamping jaws is disk-shaped, where the clamping jaws may be pressed against the second clutch part by the magnetic force of a variable magnetic flux which is carried in the clutch parts in a soft magnetic material in order to form a frictionally engaged connection between the clutch parts, where the second clutch part has a plurality of soft magnetic ring zones permeated by the magnetic flux, which extend in the circumferential direction and are separated from each other in the radial direction by slots running in the circumferential direction, where ring zones that are adjacent to each other in the radial direction are connected to each other by bridging links.

A friction clutch of this sort, in which the second coupling part is designed as a thin, flat disk, is known from DE 10 2004 015 655 A1. The disk has pressing surfaces on both sides, which are perpendicular to an axis of rotation around which the clutch parts are rotatably supported relative to each other. A magnetic circuit fed by an electromagnet is carried in a soft magnetic material of the clutch parts in such a way that the magnetic flux alternates between the clutch parts at twelve flux crossing points situated one after another in the direction of flow. In the first clutch part, the magnetic flux flows through ring-shaped soft magnetic flux conductors which are situated concentric to an axis of rotation around which the clutch parts are rotatably supported relative to each other. At the same time, the magnetic flux flows several times in sequence from the one clamping jaw axially through the second clutch part to the other clamping jaw and then back from the latter through the second clutch part to the first-named clamping jaw. The flux conductors are designed as sheet packs, which have a plurality of soft magnetic layers running in the circumferential direction which are electrically insulated from each other transversely to the direction of flow of the magnetic flux. The disk-shaped second clutch part is made from a sheet of metal panel with the help of a punching process. In the punching process, ring-segment-shaped slots are punched out of the metal sheet between ring zones. Between adjacent slots in the circumferential direction narrow bridging links remain, which join the ring zones together into a single piece. To keep the magnetic scatter flux between the ring zones to a minimum, it is advantageous for the radial bridging links to be as narrow as possible. Furthermore, an effort is made to make the walls of the second clutch part thin, in order to keep the mass inertia low. But on the other hand the bridging links should not fall below a certain minimum cross section, so that the second clutch part will have adequate mechanical stability and can transmit the torque which is exerted on the clutch parts. So that the friction clutch will enable rapid magnetic field changes, and thus highly dynamic adjustments, it is also advantageous for the second clutch part to be subdivided into the greatest possible number of ring-shaped flux conductors. However, the requirements for mechanical stability of the second clutch part permit only a relatively small number of flux conducting rings.

SUMMARY OF THE INVENTION

An object of the present invention is to provide a magnetic friction clutch of the type named at the beginning, which is economical to produce and enables highly dynamic adjustments. In addition, the friction clutch should enable high torque transfer relative to the construction space required for the second clutch part.

The present invention provides filling the slots with a solidified casting material that join the ring zones with each other, and that inner and/or outer circumferential surfaces of the ring zones that face each other follow a line that deviates from a circular line running concentric to the axis of rotation. Casting material here can also mean a material inserted into the slots by the injection molding process.

Thus in an advantageous way the torque that may be exerted on the individual ring zones by the frictional force acting between the clutch parts can also be transferred through the casting material from the first clutch part to a shaft or axle connected to the second clutch part. Because the course of the inner and/or outer circumferential surfaces of the ring zones may deviates from the circular line concentric to the axis of rotation, the casting material may be connected positively to the adjoining ring zones. The bridging links may be relieved thereby, and can have a correspondingly small total cross section. In the second clutch part only very little scatter flux may occur as a result; that is, the magnetic clutch enables transmission of a correspondingly large torque, despite compact dimensions of the second clutch part. Due to the positive connection produced between the ring zones through the casting material, the second clutch part may have great mechanical stability even when there are a relatively large number of ring zones. The friction clutch therefore may enable rapid changing of the magnetic flux, and thus highly dynamic engaging and disengaging.

In an advantageous design the facing inner and/or outer circumferential surfaces of the ring zones may have a stepped pattern, where the radial components of steps of a ring zone that are adjacent to each other in the circumferential direction point alternately inward and outward. That may enable torques and shearing forces acting in the circumferential direction of the ring zones to be transferred even better from the individual ring zones to the casting material and from the latter to an additional ring zone, if any. The radial width of the wing zones is preferably approximately constant along the circumference of the ring zones in each case.

In a preferred embodiment of the invention, the soft magnetic material of the second clutch part may be designed as a layered stack with at least two layers, which lie parallel to the main plane of extension of the second clutch part, and which differ from each other in terms of their contour so that the casting material in the slots reaches behind and engages the layers. The second clutch part then may have even greater mechanical stability.

In accordance with various embodiments of the present invention a friction clutch of the type named at the beginning is provided, by the fact that the soft magnetic material of the second clutch part may be designed as a layered stack that has at least one intermediate layer between two cover layers that extend transversely to the axis of rotation, and that the cover layers and the intermediate layer may be made of different soft magnetic materials.

In an advantageous way, this makes it possible to choose the material of the cover layers so that it may have a rougher surface and/or greater hardness than the material of the intermediate layer, and/or that the material of the cover layers may have better adhesion properties for a friction lining applied to it than the material of the intermediate layer. The material of the cover layers is preferably of a higher alloy than the material of the intermediate layer. The material of the intermediate layer is preferably chosen so that it has greater magnetic permeance than the material of the cover layers. The layered stack thereby may enable a relatively high axial magnetic permeance overall, and at the same time high wear-resistance and/or high friction on the clamping jaws of the first clutch part. The individual layers of the layered stack can be produced inexpensively as stamped parts from a soft magnetic metal sheet or foil. The layers can be joined together by bonding or by at least one welded seam. The welded seam can be produced during manufacturing of the second clutch part through frictional, ultrasound and/or laser welding. Alternatively, coining the cover layer over the edges of the middle layer before introducing the casting material may also be an economical variant for bringing the three layers together. The bent-down edge strips of the cover layers preferably lie in radially embossed indentations in the middle layer, and thus can transmit torque well. Since it may be sufficient to temper only the cover layers, heat energy may be saved in the tempering compared to a corresponding clutch part that has only a single layer, whose wall thickness corresponds to the total wall thickness of the layered stack. Thus the second clutch part may be economical to produce.

In a preferred embodiment of the invention, the slots may be filled with a solidified casting material, while the cover layers and the intermediate layer may differ from each other with regard to their contour in such a way that the casting material in the slots reaches behind and engages the cover layer(s). The second clutch part thereby may make a connection with high loading capacity and long-term stability possible between the ring zones and the casting material, even though the dimensions of the ring zones may be compact.

Expediently, the intermediate layer may also be thicker in the axial direction than the cover layers, with the intermediate layer being in particular at least five times as thick, and preferably at least ten times as thick as the individual cover layers. That may result in good magnetic permeance of the second clutch part in the axial direction.

It may be advantageous if each of the cover layers has a greater number of bridging links than the intermediate layer. That may make it possible to reduce the magnetic scatter flux between the ring zones even further, and even so the second clutch part may have great mechanical stability. The middle layer preferably has only 3 or 4 bridging links between ring zones that are adjacent to each other radially. In the cover layer there are preferably between 10 and 30 bridging links provided between adjacent ring zones.

A preferred design of the invention may include the bridging links having a tangential component, where the tangential components of linking bridges of a layer that may be adjacent to each other in the circumferential direction preferably point in directions opposite each other. Moments of torque that act between the ring zones, caused by the friction between the clutch parts, can then be supported even better by the bridging links. Because of the skewing of the bridging links, their length, and hence their magnetic resistance increases somewhat, which may cause the magnetic scatter flux flowing through the bridging links to be reduced correspondingly.

It is advantageous if the width of the bridging links in the plane of the layer in question, transverse to their longitudinal extension, may decrease as the distance from the axis of rotation increases. This differing dimensioning of the bridging links takes account of the fact that greater forces may occur at the radially inner bridging links than at the outer bridging links.

Another advantageous embodiment of the invention may include bridging links of the cover layers and of the intermediate layer that are situated in the same slot are situated in different angular sectors in reference to the axis of rotation, preferably in such a way that the bridging links of the cover layers do not overlap the bridging links of the intermediate layer. This measure is may be able to increase the mechanical stability of the second clutch part even more.

Expediently, the two cover layers may be of like design and construction. The second clutch part can then be produced especially inexpensively.

BRIEF DESCRIPTION OF THE DRAWINGS

One exemplary embodiment of the invention is explained in greater detail below. The figures show the following.

DETAILED DESCRIPTION

Figure 1:
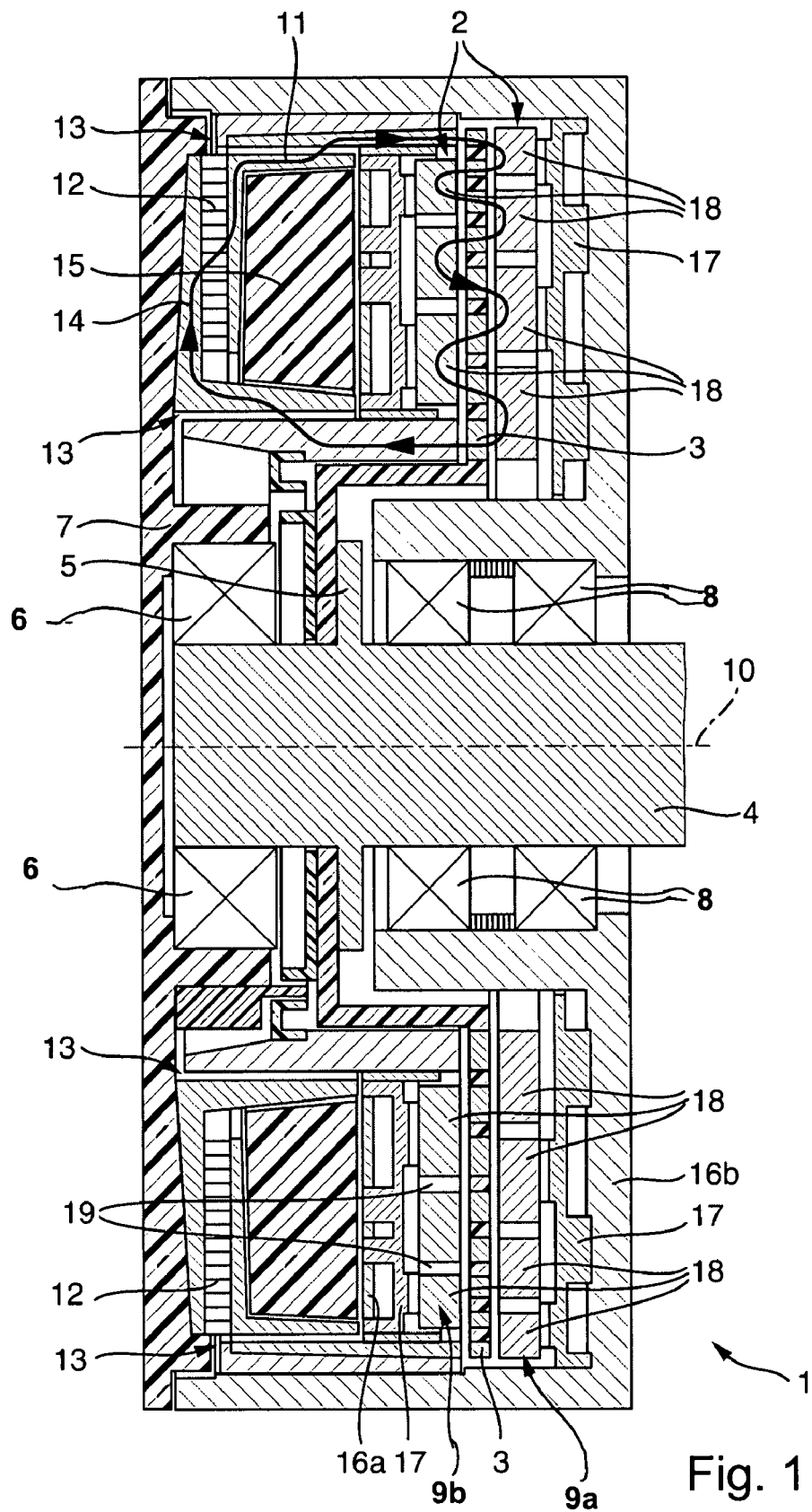
FIG. 1: a longitudinal section through an electromagnetically operable friction clutch.

A magnetic friction clutch designated in the aggregate as 1 has a first clutch part 2 and a second clutch part 3 which is rotatably mounted relative thereto, which are situated on a shaft 4 that may be for example the camshaft of a combustion engine. In FIG. 1 it can be seen that the second clutch part 3 is connected to the shaft 4 at a flange 5 provided on the shaft 4. The first clutch part 2 is connected to the shaft 4 through a first roller bearing 6 situated on the shaft 4, so that it can rotate around the longitudinal central axis of the shaft 4. Also situated on the shaft 4 is a second roller bearing 8, through which the shaft 4 is rotatably supported on a stator flange 7.

The first clutch part 2 has two clamping jaws 9a, 9b, which are movable toward and away from each other by a few micrometers axially to the shaft 4. An outer clamping jaw 9a is of ring-shaped design and has an approximately U-shaped ring cross section in a diametrical plane spanning through the axis of rotation 10 of the shaft 4 and normal to this shaft, which may be for example the drawing plane in FIG. 1. An inner U-leg of the outer clamping jaw 9a is braced against the roller bearing 8 in such a way that the outer clamping jaw 9a is fixed on the shaft 4 in the axial direction. At its outside circumference the outer clamping jaw 9a has a gripping location for a traction mechanism, which may be for example a toothed belt driven by a crankshaft of a combustion engine, which meshes with teeth provided on the outer circumference of clamping jaw 9a.

Between the U-legs of the outer clamping jaw 9a an inner clamping jaw 9b is provided, which is also ring-shaped and is also situated approximately concentrically to clamping jaw 9a. Inner clamping jaw 9b has an approximately U-shaped ring cross section in the drawing plane, and is situated in outer clamping jaw 9a in such a way that the U legs of inner clamping jaw 9b point with their free ends in the same direction as the U-legs of outer clamping jaw 9a. Inner clamping jaw 9b is connected through a second roller bearing in the form of a ball bearing to a fixed soft magnetic core 11 of an electromagnet so that it is rotatable around axis of rotation 10 and is movable somewhat in the direction of axis of rotation 10 toward soft magnetic core 11 and away from it. Stationary core 11 is firmly connected to stator flange 7, which may be attached for example to the engine block of a combustion engine.

On the outer leg parts of clamping jaws 9a, 9b are teeth which are meshed with each other, through which clamping jaws 9a, 9b are connected with each other in a rotationally fixed connection. When the friction clutch is engaged, second clutch part 3 is firmly clamped between clamping jaws 9a, 9b by a clamping force which is produced by a magnetic flux that permeates clutch parts 2, 3. The strength of the clamping force is such that clamping jaws 9a, 9b are frictionally engaged with each other without slippage. When the friction clutch is disengaged, the magnetic flux is sufficiently reduced so that the clutch parts 2, 3 can be rotated relative to each other. Second clutch part 3 is designed as a thin soft-magnetic disk, which is situated between clamping jaws 9a, 9b and extends in a plane that is perpendicular to axis of rotation 10. Second clutch part 3 is connected to shaft 4 in a rotationally fixed connection.

The magnetic flux is produced by a permanent magnet 12, which is in the form of a ring disk that extends in a plane perpendicular to axis of rotation 10. Permanent magnet 12 is situated in a magnetic circuit which permeates the two clamping jaws 9a, 9b of first clutch part 2, second clutch part 3, stationary core 11 and both air gaps 13 situated between stationary core 11 and first clutch part 2. Stationary core 11 and the areas of clutch parts 2, 3 that carry the magnetic flux are made of a soft magnetic material. In the upper half of FIG. 1, the magnetic flux is indicated by a flux line 14 and the flux direction by arrows.

The electromagnet provided for engaging and disengaging the friction clutch 1 has a coil 15 on the soft magnetic core 11, which encircles the axis of rotation 10 in a plurality of windings in the circumferential direction. Electric current can be applied to the coil 15 through electric connecting lines, so that it produces a magnetic field that is contrary to the magnetic field of permanent magnet 12, which attenuates the magnetic flux in the magnetic circuit at least enough so that the force caused by the flux, which presses the clamping jaws 9a, 9b against the second clutch part 3, is reduced so that slippage occurs between the clutch parts 2, 3. The strength of the magnetic flux of permanent magnet 12 is such that when no current is applied to coil 15 clutch parts 2, 3 transfer the moments of torque exerted on them without slippage.

It can be seen from FIG. 1 that the clamping jaws of first clutch part 2 each have a disk-shaped supporting part 16a, 16b which is made of a non-ferromagnetic material such as aluminum. Supporting parts 16a, 16b are situated approximately parallel to each other, and each have on their sides facing each other a metal grate 17 which supports a plurality of soft magnetic flux conductors 18. The flux conductors 18 of first clamping jaw 9a each have a flat pressing surface, which are in contact with flat pressing surfaces of the flux conductors 18 of second clamping jaw 9b which face them, to transfer torque through frictional engagement. The pressing surfaces are situated perpendicular to the axis of rotation 10.

Figure 2:
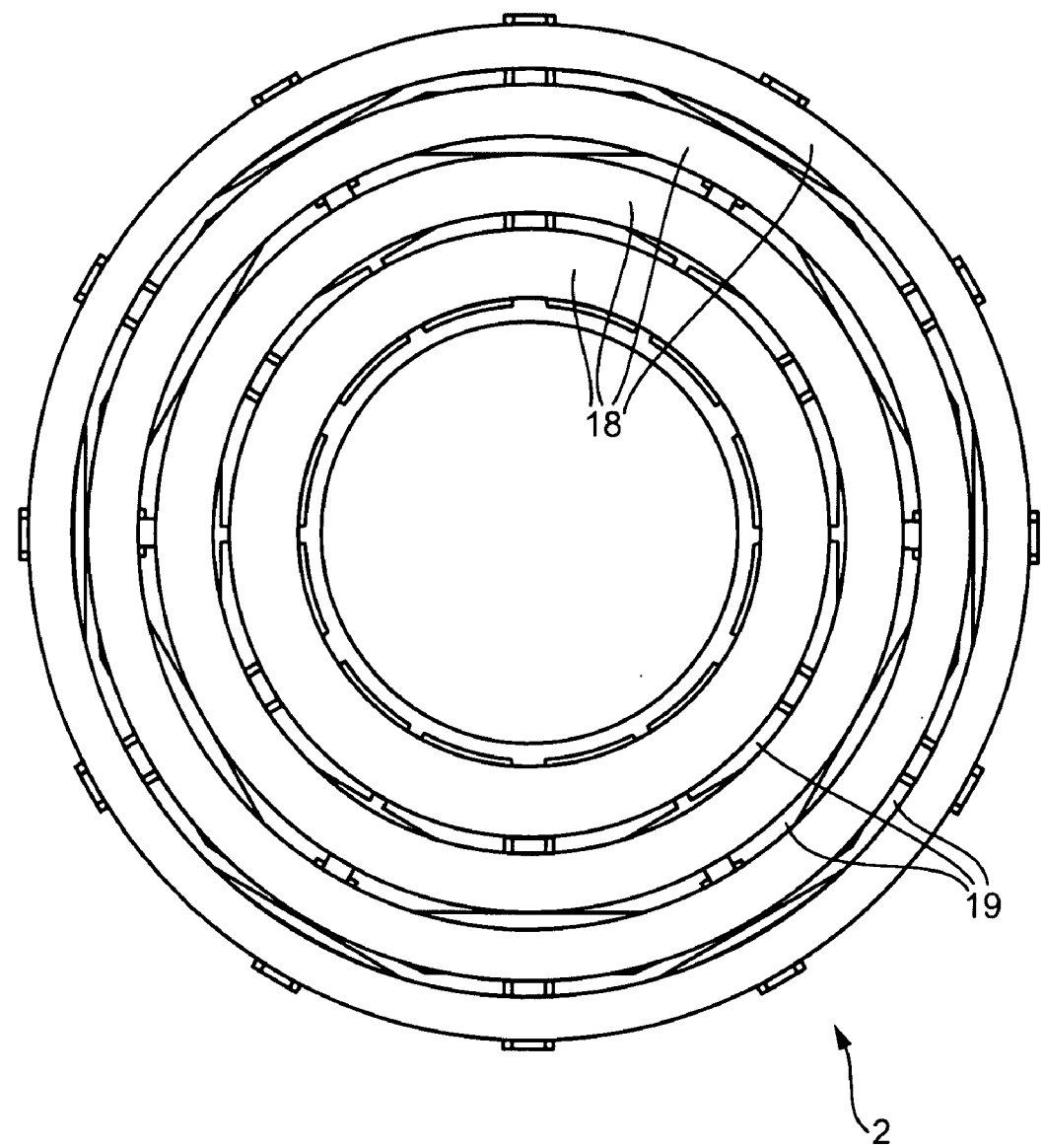
FIG. 2: a top view of a clamping jaw of the magnetic friction clutch.

The individual flux conductors 18 are designed in the form of segmented rings. In FIG. 2 it can be seen that a plurality of flux conducting rings are formed concentric to the axis of rotation 10 on supporting parts 16a, 16b, each of which is made up of a plurality of flux conductors 18 situated one after the other in the circumferential direction. In the radial direction, flux conducting rings are separated from each other by a free space 19. The flux conducting rings of first clamping jaw 9a are offset in the radial direction from the flux conducting rings of second clamping jaw 9b at a gap such that the magnetic flux alternately passes through right and left curvatures.

Figure 4:
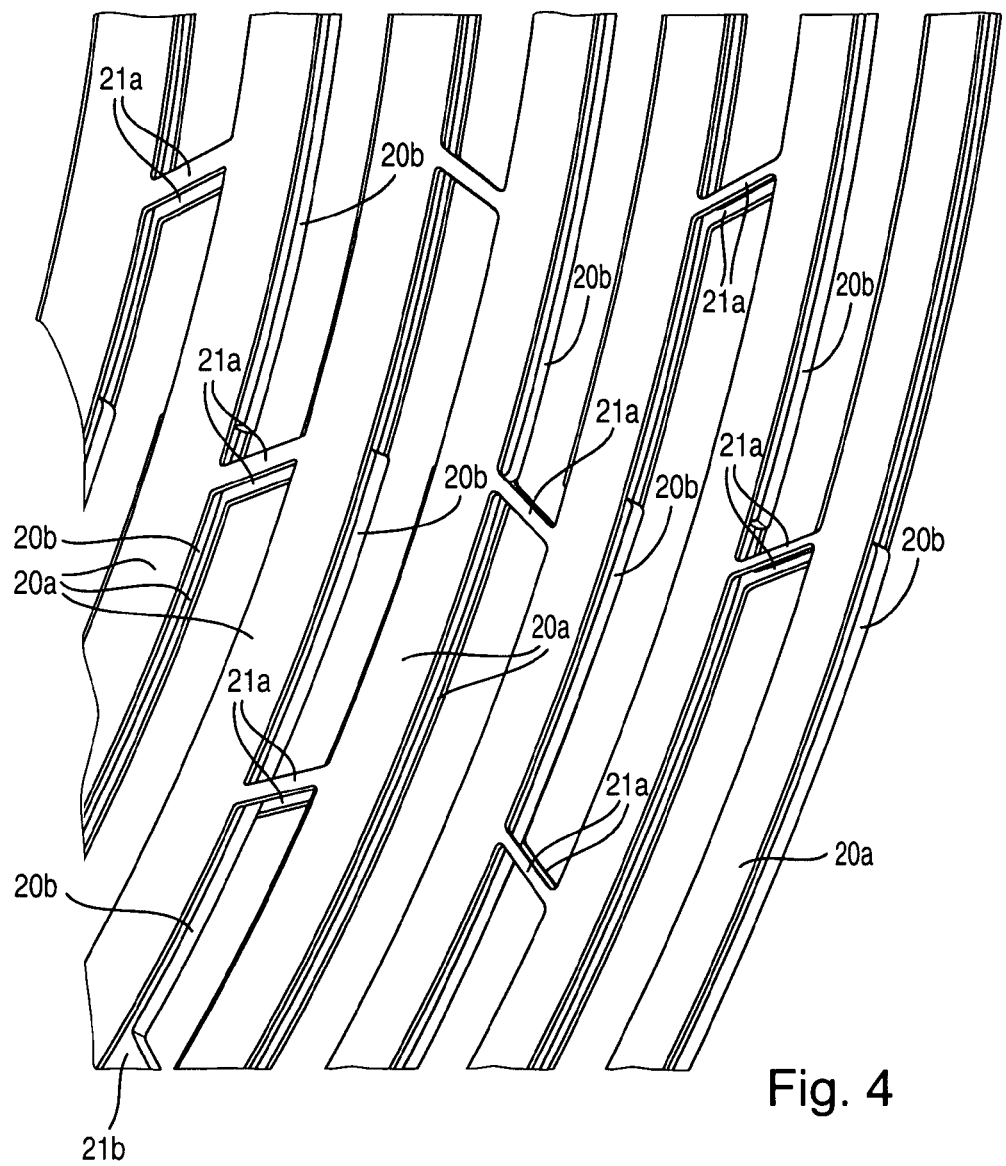
FIG. 4: a sub-area of the clutch disk, with the individual soft magnetic layers of the clutch disk are recognizable.

In FIG. 4 it can be seen that second clutch part 3 has a plurality of soft magnetic ring zones 20a, 20b, which extend in the circumferential direction along circular paths that are concentric to the axis of rotation 10. The ring zones 20a, 20b are separated from each other in the radial direction by slots, which run in the circumferential direction and are filled with a solidified casting material 25. Ring zones 20a, 20b, which follow each other in the radial direction, are connected to each other in a single piece by soft magnetic bridging links 21a, 21b.

Figure 6:
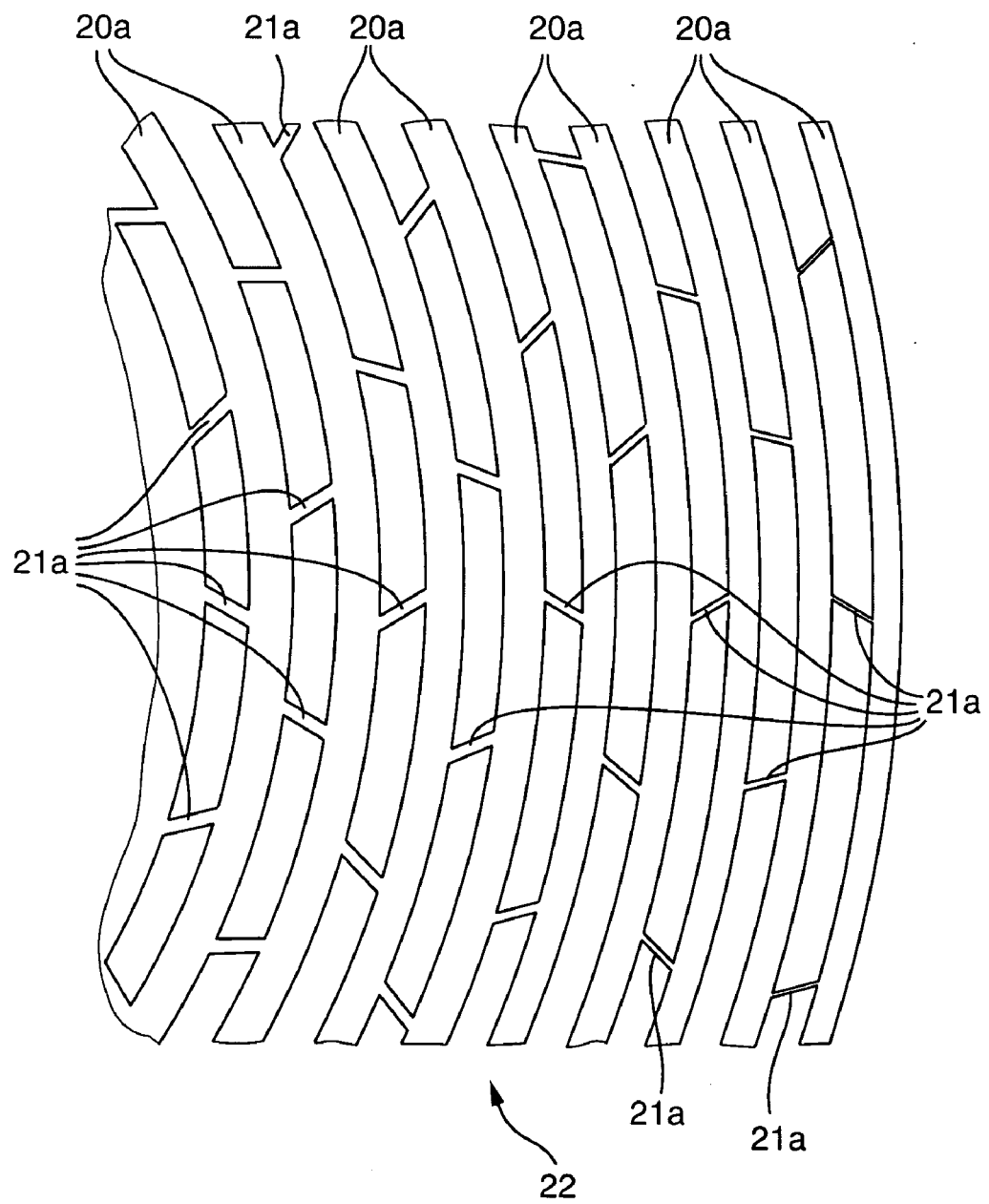
FIG. 6: an enlarged detail from FIG. 5.
Figure 7:
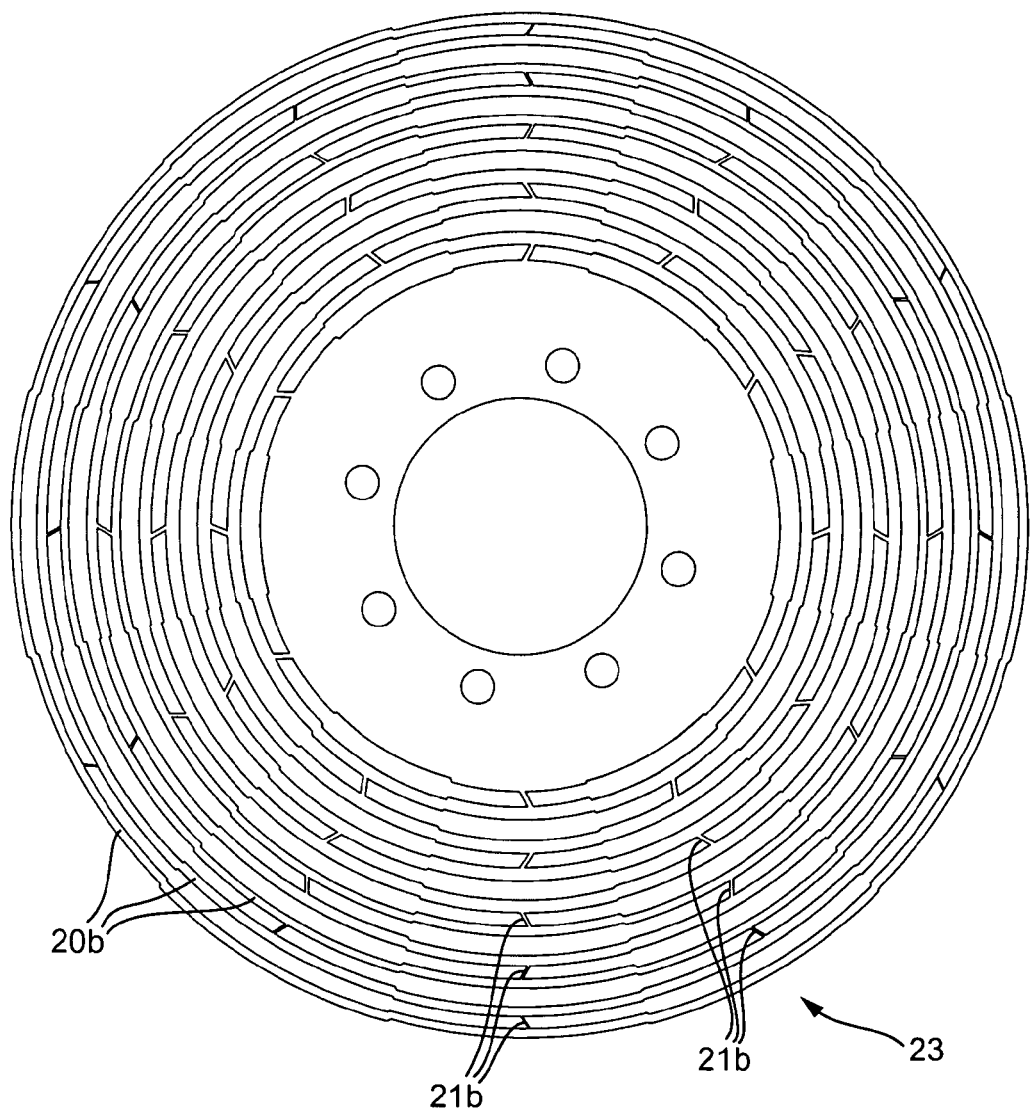
FIG. 7: a top view of an intermediate layer of the clutch disk.
Figure 8:
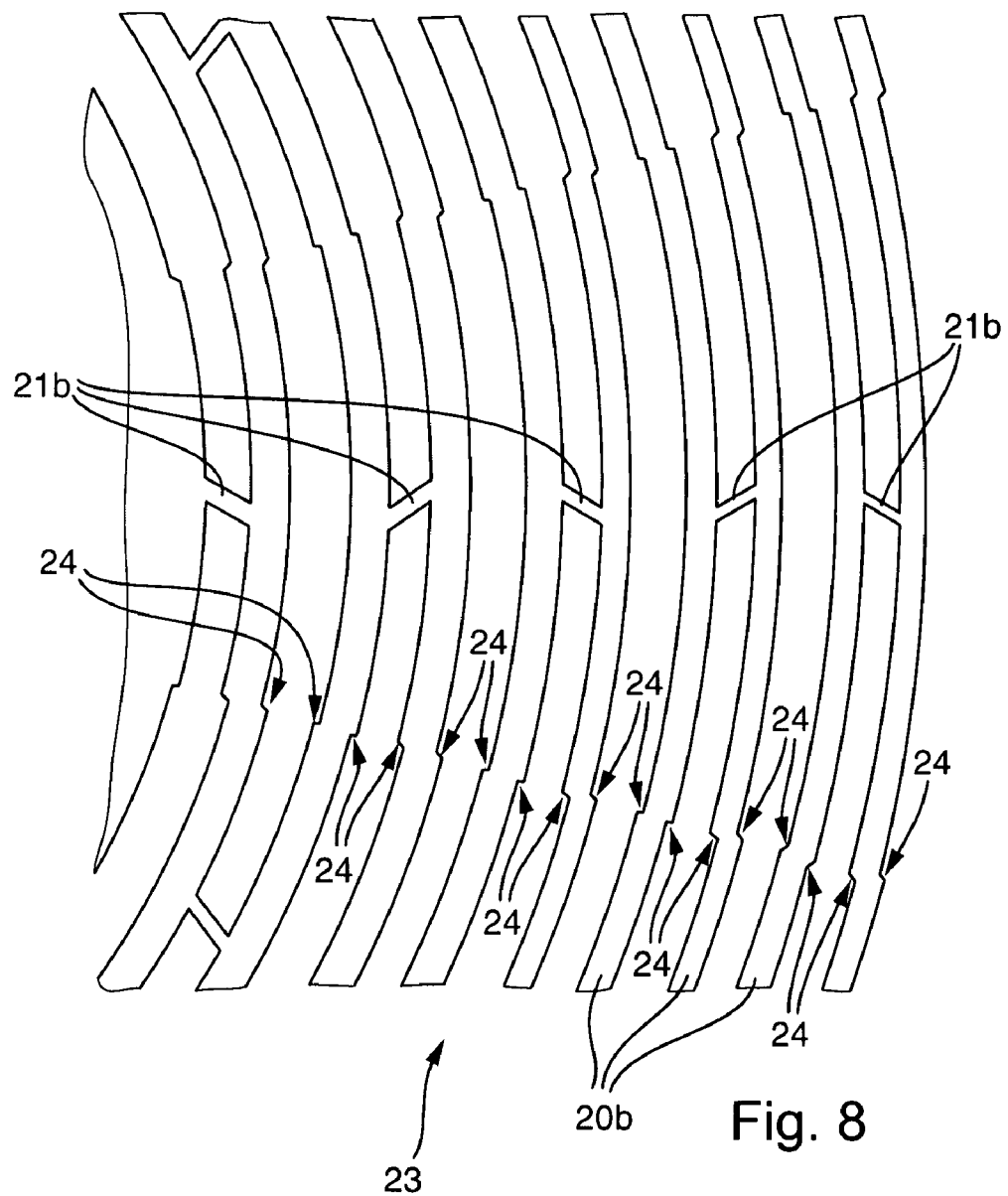
FIG. 8: an enlarged detail from FIG. 7.
Figure 9:
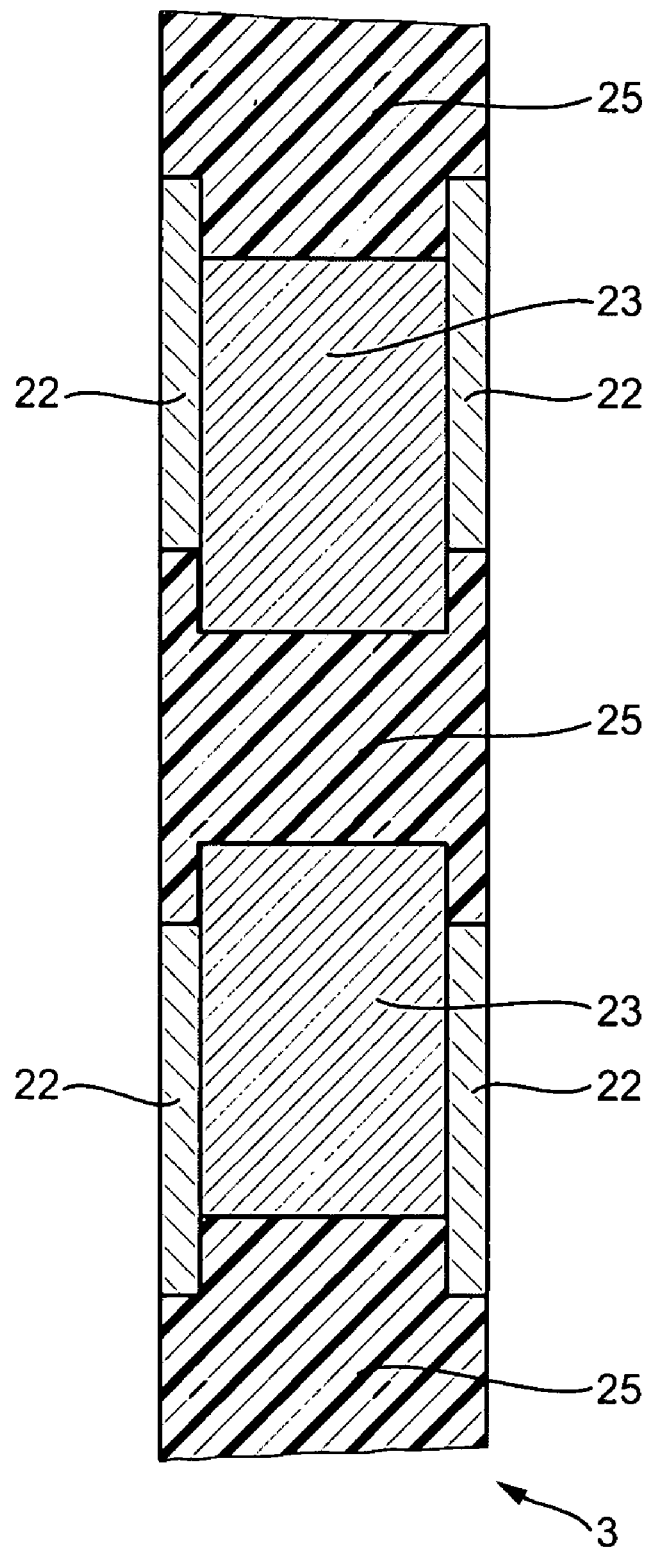
FIG. 9: a partial radial section through the clutch disk, where the casting material is also depicted.

The soft magnetic material of second clutch part 3 is formed as a layered stack, which has two cover layers 22 (FIGS. 5 and 6) and an intermediate layer 23 situated in the middle between them (FIGS. 7 and 8). The main planes of extension of the cover layers 22 and of the intermediate layer 23 run perpendicular to the axis of rotation 10. The cover layers 22 are in direct contact with the intermediate layer 23 and are welded to it. It can be seen in FIG. 5 that the cover layers 22 have a lesser axial thickness than the intermediate layer 23.

The cover layers 22 are made of a high-alloy soft magnetic ferrous material, and the intermediate layer 23 of a low-alloy ferrous material or of pure iron. Compared to the material of the intermediate layer 23, the material of the cover layers 22 has lower relative magnetic permeance and greater hardness. The cover layers 22 are hardened and can be covered on their side facing away from the intermediate layer 23 with a friction lining.

Figure 5:
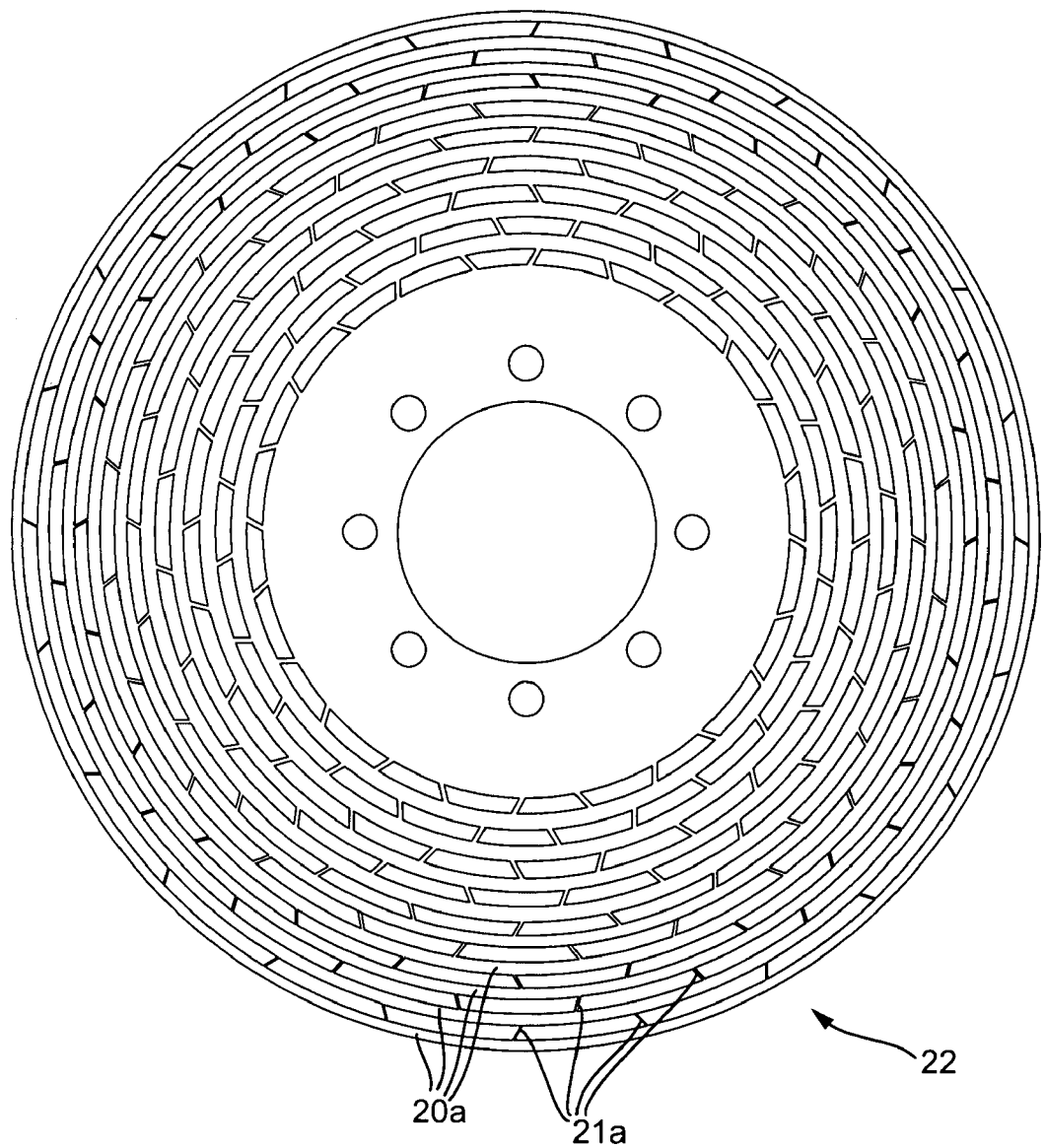
FIG. 5: a top view of a cover layer of a clutch disk of a magnetic friction clutch.

In FIGS. 5 and 6 it can be seen that the cover layers 22 also have ring zones 20a that are approximately concentric to the axis of rotation 10, and which are spaced apart from each other in the radial direction and connected with each other in a single piece by soft magnetic bridging links 21a. The bridging links 21a are situated with their longitudinal extension transverse to the ring zones 20a, and each have a component that is tangential or runs in the circumferential direction. As can be seen especially well in FIG. 6, the tangential components of bridging links 21a that follow each other in the circumferential direction, and which are at the same distance from the axis of rotation 10, point in opposite directions. At the same time, the angles by which the bridging links are inclined from the tangential direction are approximately equal in magnitude.

It is also recognizable in FIGS. 5 and 6 that the width of the bridging links 21a transverse to their longitudinal extension in the plane of the respective cover layer 22 decreases as the distance from the axis of rotation 10 increases. The radially outer bridging links 21a are therefore narrower than the inner ones. The number of bridging links 21a for the individual slots running in the circumferential direction is the same, and is 24 in each case. The radial width of the ring zones 20a decreases from inside to outside. The decrease in width is chosen so that the individual ring zones 20a in the top view of a cover layer of the second clutch part 3 depicted in FIG. 5 have approximately the same area permeated by the magnetic flux. The radial width of the slots is approximately the same for all slots, regardless of how far distant they are from the axis of rotation 10.

In FIGS. 7 and 8 it can be seen that the intermediate layer 23 also has ring zones 20b that are approximately concentric to the axis of rotation 10, and which are spaced apart from each other in the radial direction and connected with each other in a single piece by soft magnetic bridging links 21b. The bridging links 21b are situated with their longitudinal extension transverse to the ring zones 20b, and each have a component that runs tangentially. The tangential components of bridging links 21b that follow each other in the circumferential direction, and which are at the same distance from the axis of rotation, run in opposite directions. At the same time, the angles by which the bridging links are inclined from the tangential direction are approximately equal in magnitude, and correspond approximately to the angle of inclination of the bridging links 21a of the cover layer.

Figure 3:
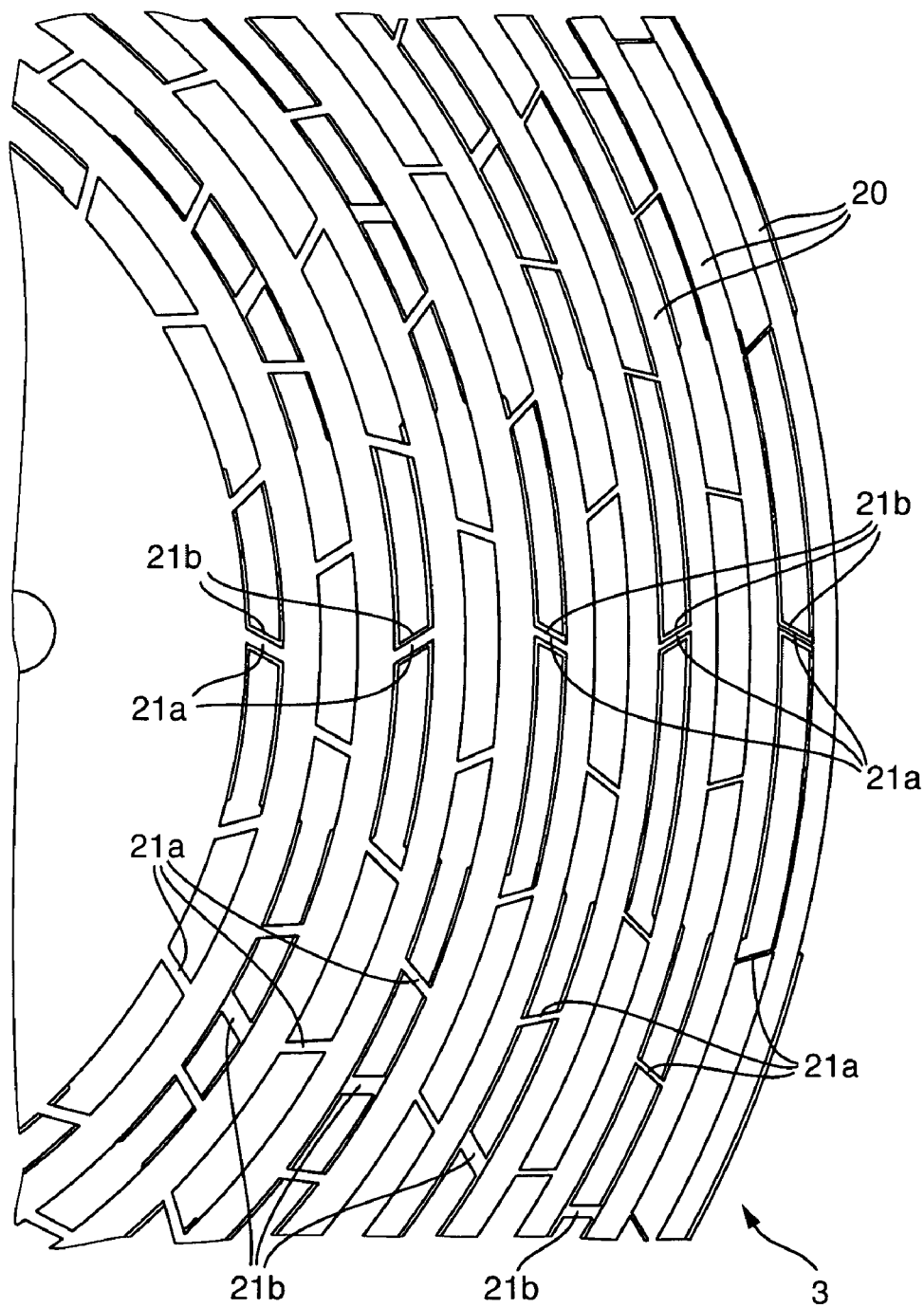
FIG. 3: a top view of a multi-layered clutch disk of the friction clutch.

It is also recognizable in FIGS. 7 and 8 that the width of the bridging links 21b transverse to their longitudinal extension in the plane of the intermediate layer 23 decreases as the distance from the axis of rotation 10 increases. A comparison of FIG. 7 with FIG. 5 makes it clear that the cover layers 22 each have a greater number of bridging links 21a than the intermediate layer 23. It can also be seen from FIG. 3 that the bridging links 21a of the cover layers 22 do not overlap the intermediate layer 23. However, the individual ring zones 20a of the cover layers 22 do largely overlap the associated ring zone 20b of the intermediate layer 23.

The outer circumferential surfaces of the ring zones 20b of the intermediate layer 23 each follow a line that deviates from a circular line running concentric to the axis of rotation, as can be recognized especially well in FIG. 8. This comes about because the inner and/or outer circumferential surfaces of the ring zones 20b have steps 24. The radial components of steps 24 following after each other in the circumferential direction which are at approximately the same distance from the axis of rotation 10 point alternately inward and outward. Furthermore, the steps 24 are situated so that the radial width of the individual ring zones 20b along the circumference of the ring zones 20b is approximately constant. Starting from the axis of rotation 10 outward in the radial direction, the radial width of the ring zones 20b decreases from one ring zone 20b to the next ring zone 20b. It can be seen from FIG. 4 that the intermediate layer 23 forms radial projections and recesses between the cover layers 22. The casting material reaches behind and engages the intermediate layer at the projections, and the cover layers 22 at the recesses. This results in a mechanically stable clutch disk.

The steps 24 of ring zones 20b of the intermediate layer 23 that follow each other in the radial direction point in opposite directions in the same angular sector. This causes the radial width of the slots separating the ring zones 20b to fluctuate by twice the height of the steps (FIG. 8). The bridging links 21b are situated in the angular sectors in which the slots have a smaller angular width. At the same time, the bridging links 21b are approximately centered in these angular sectors.

REFERENCE LABELS 1 friction clutch
2 first clutch part
3 second clutch part
4 shaft
5 flange
6 first roller bearing
7 stator flange
8 roller bearing
9a first clamping jaw
9b second clamping jaw
10 axis of rotation
11 core
12 permanent magnet
13 air gap
14 flux line
15 coil
16a supporting part
16b supporting part
17 grate
18 flux conductor
19 free space
20a ring zone
20b ring zone
21a bridging link
21b bridging link
22 cover layer
23 intermediate layer
24 step
25 casting material

What is claimed is:

1. A magnetic friction clutch comprising:
at least a first and a second clutch part supported so that the first and the second clutch parts are rotatable relative to each other around an axis of rotation, the first clutch part including at least a first and a second clamping jaw movable toward each other and away from each other, the second clutch part being situated between the first and the second clamping jaws and being disk-shaped, the first and the second clamping jaws pressable against the second clutch part by a magnetic force of a variable magnetic flux carried in the first and the second clutch parts in a soft magnetic material in order to form a frictionally engaged connection between the first and second clutch parts, the second clutch part including a plurality of soft magnetic ring zones permeated by the magnetic flux, the ring zones extending in a circumferential direction and separated from each other in a radial direction by slots running in the circumferential direction, the ring zones adjacent to each other in the radial direction being connected to each other by bridging links, the slots being filled with a hardened casting material connecting the ring zones with each other, and inner and/or outer circumferential surfaces of the ring zones facing each other follow a line deviating from a circular line running concentric to the axis of rotation, and the soft magnetic material of the second clutch part has a layered stack, the layered stack of the second clutch having at least one intermediate layer between two cover layers extending transversely to the axis of rotation, the cover layers and the intermediate layer being different soft magnetic materials.

2. The magnetic friction clutch as recited in claim 1 wherein the inner and/or outer circumferential surfaces of the ring zones face each other and have a stepped pattern.

3. The magnetic friction clutch as recited in claim 2 wherein the radial components of steps of the ring zone adjacent to each other in the circumferential direction point alternately inward and outward.

4. The magnetic friction clutch as recited in claim 1 wherein the cover and intermediate layers lie parallel to a main plane of extension of the second clutch part, and the cover and intermediate layers differing from each other in contour so that the casting material in the slots reaches behind and engages the cover and intermediate layers.

5. The magnetic friction clutch as recited in claim 1 wherein the slots being filled with the hardened casting material and the cover layers and the intermediate layer differing from each other in contour so that the casting material in the slots reaches behind and engages the cover layers and/or the intermediate layer.

6. The magnetic friction clutch as recited in claim 1 wherein the axial direction of the intermediate layer is thicker than the axial direction of the cover layers, the intermediate layer being at least five times as thick in the axial direction as the individual cover layers.

7. The magnetic friction clutch as recited in claim 5 wherein the axial direction of the intermediate layer being ten times as thick as the axial direction of the individual cover layers.

8. The magnetic friction clutch as recited in claim 1 wherein the cover layers each have a greater number of bridging links than the intermediate layer.

9. The magnetic friction clutch as recited in claim 1 wherein the bridging links have a tangential component, the tangential components of the bridging links of the intermediate or cover layer that are circumferentially adjacent to each other pointing in opposite directions.

10. The magnetic friction clutch as recited in claim 1 wherein the bridging links in the plane of the intermediate or the cover layer having decreasing widths as the distance from the axis of rotation increases.

11. The magnetic friction clutch as recited in claim 1 wherein the bridging links of the cover layers and of the intermediate layer in the same slot being in different angular sectors of the axis of rotation, the bridging links of the cover layers not overlapping the bridging links of the intermediate layer.

12. The magnetic friction clutch as recited in claim 1 wherein the cover layers being of like design and construction.

* * * * *